D. MULOCK,

Assignor to THE AULTMAN & TAYLOR COMPANY.

Wheel for Vehicles.

No. 8,852. Reissued Aug. 12, 1879.

WITNESSES

F. L. Ouraud

Alex. Mahon

INVENTOR

Daniel Mulock by A. M. Smith

ATTORNEY

THE NORRIS PETERS CO., PHOTO-LITHO., WASHINGTON, D. C.

UNITED STATES PATENT OFFICE.

DANIEL MULOCK, OF MOUNT HOPE, NEW YORK, ASSIGNOR TO THE AULTMAN & TAYLOR COMPANY, OF MANSFIELD, OHIO.

IMPROVEMENT IN WHEELS FOR VEHICLES.

Specification forming part of Letters Patent No. 112,167, dated February 28, 1871; Reissue No. 8,852, dated August 12, 1879; application filed June 9, 1879.

*To all whom it may concern:*

Be it known that I, DANIEL MULOCK, of Mount Hope, county of Orange, State of New York, have invented certain new and useful Improvements in Traction-Wheels, of which the following is a full, clear, and exact description, reference being had to the accompanying drawings, making part of this specification, in which—

Figure 1:
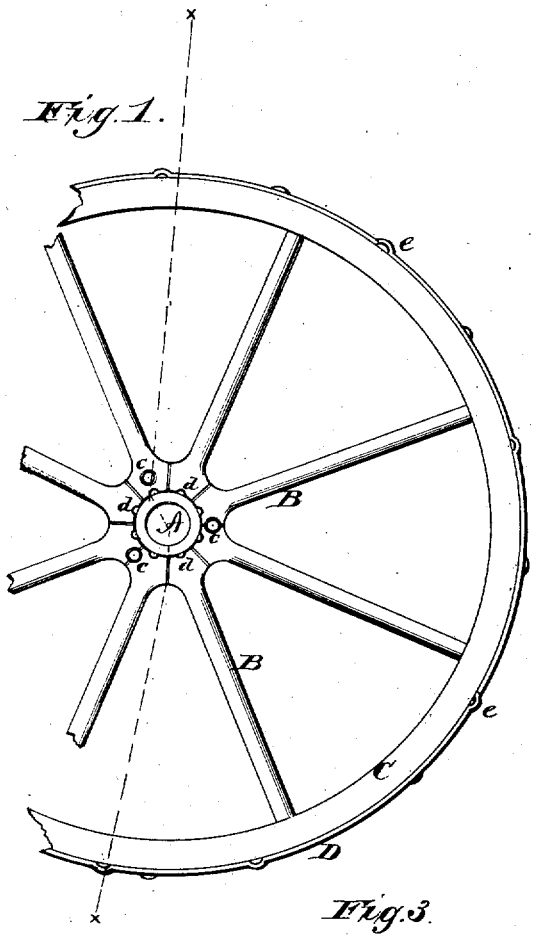
Figure 2:
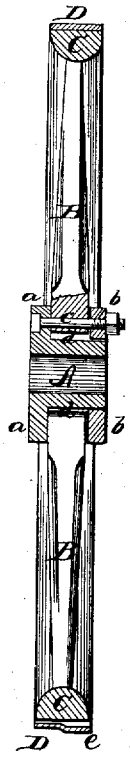
Figure 3:
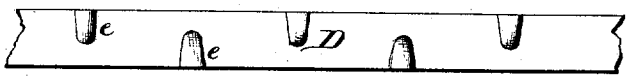

Figure 1 represents a face view, partly in section, of my improved wheel for vehicles. Fig. 2 is a central transverse section of the same through the line *x x*, Fig. 1. Fig. 3 is a face view of a section of the tire.

Similar letters of reference denote corresponding parts wherever used.

The invention relates to a novel construction of wrought-metal tire for traction-wheels; and consists in providing such tire with ribs or projections in the process of rolling, the object being to dispense with the heavy and expensive cast-iron wheels heretofore used for agricultural and other traction machines and vehicles, and to provide a tire having the necessary projections, adapting it to take a firm hold on the ground and prevent the wheel from slipping, while at the same time it is also adapted to be applied to the wheel and to be removed and cut or upset, and reapplied as readily as in the case of ordinary tire.

In the accompanying drawings, A represents the hub of the wheel; B B, the spokes; C, the fellies, and D the tire.

The hub is provided with two flanges, *a* and *b*, between which the ends of the spokes are held, the flanges *b* being loose, so as to be laterally adjustable. It is connected with the flange *a* by three or more bolts, *c c*, and is drawn tight enough against the spokes to hold them securely to the hub.

From the outer circumference of the hub a series of longitudinal ribs, *d d*, project one in line with each spoke, each rib entering a corresponding groove in the end of the spoke. The spokes are thereby retained in place the requisite distance apart.

The tire D is of wrought metal, and is represented as provided with projecting ribs or teeth *e e*, adapting it to take a firm hold on the ground.

Traction-wheels for agricultural and other machines have heretofore either been cast in order to provide them with ribs or projections on their periphery, and, as a consequence, were necessarily made very heavy, or the ribs have been riveted on wrought-iron tire—a process both difficult and expensive. They are formed, in the present instance, in the process of rolling or stamping the tire, and, as a consequence, the tire is adapted to be applied and to be removed when necessary for the purpose of cutting or upsetting, and then to be reapplied as in the case of ordinary tire for vehicles. This construction of tire renders it practicable to make the traction-wheels of this class of machines much lighter, and at greatly-reduced cost as compared with the wheels heretofore used for such machines.

Having now described my invention, I claim—

Wrought-metal tire provided with ribs or projections formed in the process of rolling.

DANIEL MULOCK.

Witnesses:

G. R. GRAHAM,

JAMES KETCHAM.